US012759027B2

(12) United States Patent
Anderson et al.

(10) Patent No.: US 12,759,027 B2
(45) Date of Patent: Oct. 13, 2026

(54) SCRUBBER AND METHOD FOR SCRUBBING HYDROGEN SULFIDE

(71) Applicants: Fusion Industries Inc., Estevan (CA); Flawless Sales & Services Ltd., Estevan (CA)

(72) Inventors: Hans Kevin Anderson, Bienfait (CA); Daniel Driedger, Estevan (CA)

(73) Assignees: Fusion Industries Inc., Estevan (CA); Flawless Sales & Services Ltd., Estevan (CA)

( * ) Notice: Subject to any disclaimer, the term of this patent is extended or adjusted under 35 U.S.C. 154(b) by 151 days.

(21) Appl. No.: 18/436,129

(22) Filed: Feb. 8, 2024

(65) Prior Publication Data

US 2024/0261829 A1 Aug. 8, 2024

Related U.S. Application Data

(60) Provisional application No. 63/483,855, filed on Feb. 8, 2023.

(51) Int. Cl.

| | |
|---|---|
| ***B01D 47/00*** | (2006.01) |
| ***B01D 47/02*** | (2006.01) |
| ***B08B 3/08*** | (2006.01) |
| ***B08B 3/10*** | (2006.01) |
| ***B08B 5/04*** | (2006.01) |
| ***B08B 7/04*** | (2006.01) |

(52) U.S. Cl.

CPC .............. *B08B 7/04* (2013.01); *B01D 47/021* (2013.01); *B08B 3/08* (2013.01); *B08B 3/10* (2013.01); *B08B 5/04* (2013.01)

(58) Field of Classification Search

CPC ....... B01D 47/00; B01D 47/02; B01D 47/021

See application file for complete search history.

(56) References Cited

U.S. PATENT DOCUMENTS 6,241,809 B1 * 6/2001 Hopkins ................. F24C 15/20 55/DIG. 36

FOREIGN PATENT DOCUMENTS

FR 2751167 A1 * 1/1998 ......... A01D 43/0633

* cited by examiner

*Primary Examiner* — Robert A Hopkins

(74) *Attorney, Agent, or Firm* — NK Patent Law

(57) ABSTRACT

Scrubber and method for scrubbing pollutants such as $H_2S$ are provided. The scrubber may comprise a first container and a second container. Polluted waste injected in the first container is restricted and enters into a plurality of slotted pipes located in the second container. The polluted waste is released from the slots at the bottom of the slotted pipes into scavenger chemicals for treatment. A large portion of treated gas raised from the scavenger chemicals is blocked and condensed at an angled plate, and drops back into scavenger chemicals for further treatments. A second slotted pipe is also provided to the second container for directly taking the pollutant into the scavenger chemicals for treatment. A transparent monitoring tube located outside of the second container is in fluid communication with the scavenger chemicals for monitoring the changes of the scavenger chemicals inside the second container.

15 Claims, 3 Drawing Sheets

SCRUBBER AND METHOD FOR SCRUBBING HYDROGEN SULFIDE

CROSS-REFERENCE

This application claims the benefit of U.S. Provisional Application No. 63/483,855, filed on Feb. 8, 2023, which is explicitly incorporated herein by reference.

FIELD

The invention generally relates to systems and methods for cleaning pollutants from polluted waste generated in oil and gas field, particularly to a scrubber and a method for scrubbing hydrogen sulfide (H2S).

BACKGROUND

Toxic pollutants and waste gas may be generated during oil and gas production. The hazardous and toxic materials in the pollutants and waste gas may harm the environment or public health if released into the environment. Regulations from government require that the gas generated from industries must meet a standard set by a government authority. Various types of systems and methods for cleaning pollutants and waste gas have been developed. In particular, different types of H2S scrubbers have already been commercially used in oil and gas industry, such as wet scrubber or gas scrubber for different purposes. However, there is still a need to improve the efficiency and quality of current scrubbers and to provide a more convenient and compatible system to work with other vehicles or devices in the field.

SUMMARY

According to one aspect, a scrubber for scrubbing pollutants from polluted waste is provided. The scrubber may comprise: a first container having a side wall, a bottom wall and a top wall for containing the polluted waste comprising an inlet and at least one opening; and a second container having a side wall, a bottom wall and a top wall for containing scavenger chemicals. The second container may comprise an outlet for releasing clean air and at least one slotted pipe coupled to the opening of the first container for receiving the polluted waste. The at least one slotted pipe is submerged in the scavenger chemicals of the second container.

In another aspect, the second container may further comprise an angled plate attached to the side wall of the second container above the scavenger chemicals for condensing initially treated gas released from the scavenger chemicals back into the scavenger chemicals.

According to one aspect, the angled plate may have a free side extending downwards toward the scavenger chemicals so that the angled plate forms an acute angle with respect to the side wall of the second container.

According to another aspect, the second container may further comprise a plurality of angled baffles attached to the top wall of the second container for further condensing the initially treated gas and making it to drop back into the scavenger chemicals for further treatment.

According to another aspect, each of the at least one slotted pipe may comprise a series of slots along its length and located on a bottom part. The polluted gas may be released from the slots at the bottom into the H2S scavenger chemicals for treatment.

According to another aspect, the second container may comprise a second inlet pipe located under the angled plate. The second inlet pipe has an open end extending to outside of the second container for taking the polluted waste and a horizontal portion submerged in the scavenger chemicals for releasing the polluted waste into the scavenger chemicals. The horizonal portion of the second inlet pipe may have a series slots on a bottom part of the second inlet pipe.

According to another aspect, the second container may comprise a monitoring pipe made of transparent or translucent material. The monitoring pipe is located outside the second container and is in fluid communication with the scavenger chemicals inside the second container so that any changes in the scavenger chemicals, such as color, sediment, and/or density, may be visualized through the monitoring pipe to determine if it is time to change the scavenger chemicals.

According to another aspect, a method for treating polluted waste is provided. The method may comprise steps: injecting the polluted waste into scavenger chemicals through a series of slots of at least one slotted pipe submerged into the scavenger chemicals contained in a container; treating the polluted waste in the scavenger chemicals; releasing initially treated gas from the scavenger chemicals; condensing the initially treated gas to liquid by an angled plate and making the liquid to drop back into the scavenger for further treatment; and releasing clean gas into environment after the further treatment.

According to another aspect, the method may comprise condensing the further treated gas for another treatment before releasing the clean gas into the environment.

According to another aspect, the step of injecting polluted waste may comprises injecting the polluted waste in the first container; and allowing the polluted waste to entering the at least one slotted pipes in the second container.

According to another aspect, treating the polluted waste is treated under a pressure of about 3 pounds per square inch (PII) and a temperature of about 190° F. in the second container.

DESCRIPTION OF THE DRAWINGS

While the invention is claimed in the concluding portions hereof, example embodiments are provided in the accompanying detailed description which may be best understood in conjunction with the accompanying diagrams:

DETAILED DESCRIPTION

Figure 1:
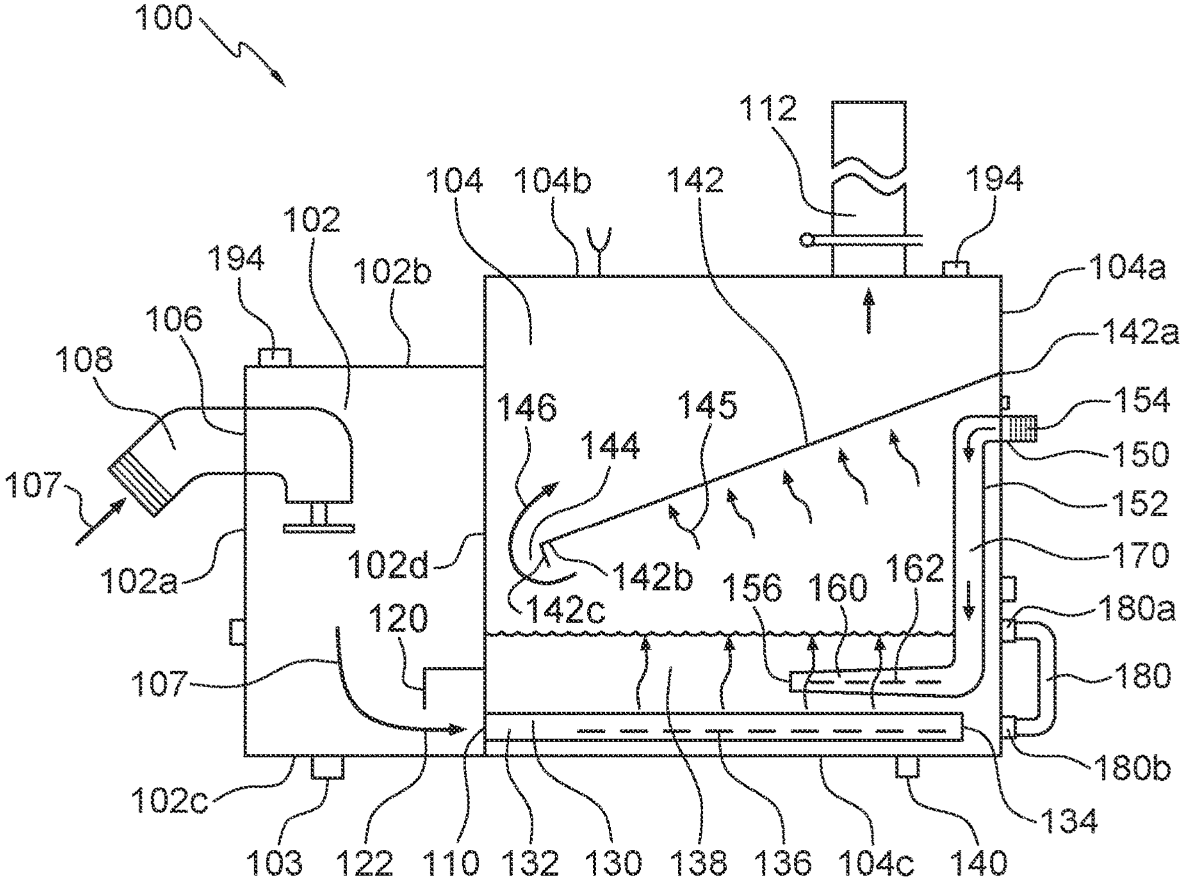
FIG. 1 is a cross-sectional view of a H2S scrubber for scrubbing H2S.

FIG. 1 shows an example scrubber 100 for scrubbing pollutants from polluted waste. The polluted waste could be polluted gas or in combination with polluted liquid generated in different industries such as that produced during oil and gas production. The pollutants could be hydrogen sulfide, H2S or some other toxic chemicals. In this example, the scrubber 100 is used for scrubbing hydrogen sulfide and may comprise a first container 102 and a second container 104. The first container 102 and the second container 104 may be formed by pieces of sheet metal welded or otherwise fastened together in a cylindrical or cubical shape so that pollutant or wastes air can be held inside. The first container 102 may have an inlet 106 for receiving a polluted gas 107 or waste gas to be cleaned. For example, when a vacuum truck (not shown) is vacuuming up debris contaminated with hydrocarbons and/or hydrogen sulfide, the debris may be collected within the vacuum truck. An outlet of the vacuum truck may expel the polluted gas 107 to the environment. The outlet of the vacuum truck may be coupled to a first inlet pipe 108 and the scrubber 100 may remove one or more pollutants from the polluted gas 107 as described in further detail below.

According to one aspect, the first inlet pipe 108 may be coupled to an inlet 106 of the first container 102 at a side wall 102*a* and close to a top wall 102*b* so that polluted gas 107 can enter inside of the first container 102 through the first inlet pipe 108 and flow downwards toward to a bottom wall 102*c* or under a pressure to flow downwards. In this example, the first inlet pipe 108 may be a 6 inch pipe that is directly attached to vacuum truck. The first inlet pipe 108 may further comprise a sealing mechanism so that polluted gas cannot flow back.

In one aspect, the side wall 102*a* may have a wall portion 102*d* shared with the second container 104. One or more openings 110 on the shared portion 102*d* of the side wall 102*a* may permit polluted gas to flow from an interior of the first container 102 into an interior of the second container 104. In one aspect, the openings 110 may be located close to a bottom wall 102*c* so that a flow of the polluted gas 107, shown by arrow in FIG. 1, may enter the second container 104. A first drain pipe 103 may be located at the bottom wall 102*c* for removing a condensed liquid and/or deposits from the polluted gas 107. One or more couplings 194 may be located at the top walls 102*b*, 104*b* in order to facilitate introducing a cleaning solution and/or a pressurized fluid to the first container 102 and/or the second container 104.

Although the aspect in FIG. 1 shows that the first container 102 and the second container 104 have a shared wall portion 102*d*, persons skilled in that art would understand on reviewing the description herein that the first container 102 may be separate from the second container 104 with openings connected at a bottom portion of the side wall of the first container 102 and the second container 104 for direct gas or fluid communication.

In another aspect, a baffle 120 may be arranged above the openings 110. The baffle 120 may be folded by a piece of sheet metal into a “L”-shape (when viewed from the side) and welded to the shared portion 102*d*. The baffle 120 may cover an area above the openings 110 and leave an entrance 122 for the polluted gas 107 to enter into the openings 110, thereby flowing into the second container 104. The size of the entrance 122 may be configured for guiding or restricting an amount or a flow rate of the polluted gas 107 entering into the openings 110. In one aspect, the size or total area of the entrance 122 may be configured to be larger than the size of the first inlet pipe 108 so that no pressure build-up (or little pressure build-up) occurs in the first container 102. For example, the size of the entrance 122 may be 2"×48" (total 96 square inches), and the size of the first inlet pipe 108 may be 28.27 square inches.

The second container 104 may be arranged beside the first container 102. In one aspect, the second container 104 may have a larger volume than the first container 102. For example, the first container 102 may have a 24-inch diameter and 48-inch height whereas the second container 104 may have a 48-inch diameter and 60-inch height. The second container may have a side wall 104*a*, a top wall 104*b*, and a bottom wall 104*c*. The polluted gas 107 may be processed in the second container 104 to remove the hydrogen sulfide. An outlet 112 may be located on the top wall 104*b* for a treated gas to release to the environment. In this aspect as discussed above, the second container 104 and the first container 102 may have the shared portion 102*d* on a portion of the side wall 102*a*, as well on a portion of the side wall 104*a*. One or more slotted pipes 130 may be arranged inside of the second container 104. Each slotted pipe 130 may be fluidly coupled with each opening 110 on the shared portion 102*d*. In this aspect, four slotted pipes 130 are presented. However, a person skilled in the art would understand based on the disclosure herein that more or less slotted pipes and openings may be used depending on an amount of flow of the polluted gas 107.

In one aspect, each slotted pipe 130 may have an open end 132 on a first side that is coupled with the opening 110, and a closed end 134 on a second side. The slotted pipe 130 may have a series of slots 136 along its length and located on the bottom part. In this aspect, the slotted pipe 130 may be a 4-inch diameter pipe with eighteen slots 136 in each of the four pipes (total 124 square inches), and each slot may have an opening size of ¾-inches by 4-inches. The slots 136 may allow the polluted gas 107 to release from the slots 136 from the bottom of the slotted pipes 130 and into a chemical solution 138 in the second container 104, usually referred to as hydrogen sulfide (H2S) scavenger chemicals 138 for removing the hydrogen sulfide.

The H2S scavenger chemicals 138 may be a specialized chemicals used in oil and gas industry, partially in hydrocarbon and chemical processing facilities. In some aspects, the scavenger chemicals 138 may react with the hydrogen sulfide and may remove H2S to below an acceptable level from the polluted gas 107 to produce a treated gas. In another aspect, the hydrogen sulfide may be dissolved into the scavenger chemicals 138, such as water, to produce an aqueous solution of a weak acid of hydrosulfide ions. The hydrosulfide ions may oxidize over time into elemental sulfur. There are various types of scavenger chemicals in the industries to capture H2S gas. In summary, any type of the scavenger chemicals 138 may encapsulate, hold, and/or bond to the H2S gas until the mixture can be disposed of or recycled.

According to another aspect, the second container 104 may also include a drain pipe 140, such as a 2 inch pipe, at the bottom wall 104*c*, for draining and replacing the scavenger chemicals 138 and/or any deposits of sulfur after being used.

According to another aspect, the second container 104 may include an angled plate 142 above a surface of the H2S scavenger chemicals 138. The angled plate 142 may be made of a piece of sheet metal having an attaching side 142*a* attached or welded to the side wall 104*a* of the second container 104 and a free side 142*b* that is not attached or welded to the side wall 102*d* of the second container 104. The angled plate 142 extends above the surface of the H2S scavenger chemicals 138. The angled plate 142 may extend across the second container 104 to divide a bottom portion of the second container 104 containing the scavenger chemicals 138 from a top portion of the second container 104 having the outlet 112.

A release exit 144 may be formed from the free side 142*b* and close to the side wall 102*d*. The release exit 144 may permit the treated gas 146 to flow from the bottom portion to the top portion of the second container 104. During the treatment, a majority of the initially treated gas flow may be blocked by the angled plate 142 and/or flow along the angled plat 142. Any moisture within the initially treated gas 145 may be condensed into liquid on the bottom surface of the angled plate 142. The liquid collected by the angled plate 142 may drop back into the H2S scavenger chemicals 138 for further treatment or to return any evaporated scavenger back to the liquid scavenger chemicals 138.

In one aspect, the free side 142*b* extends downwards toward the surface of the H2S scavenger chemicals 138 so that an acute angle is formed between the angled plate 142 and the side wall 104*a* at the attaching side 142*a*. This angled plate 142 may guide the liquid condensed on the bottom surface of the angled plate 142 to flow downwards along the angled plate 142 to a lower end of the angled plate 142 and effectively drop into the H2S scavenger chemicals 138. In this example, the angled plate 142 may be approximately 60-degrees with respect to the side wall 104*a* and may have a maximum surface area that can be installed in the second container 104.

In a further aspect, the angle plate 142 may comprise a ridge or lip guiding part 142*c* extending downward and generally perpendicular to the angled plate 142 to guide the condensed liquid to drop into the H2S scavenger chemicals 138 in a direction away from the release exit 144. Should the condensed liquid have any hydrogen sulfide, the condensed liquid may be further treated by the scavenger chemicals 138.

According to another aspect, the second container 104 may comprise a second inlet 150 on the side wall 104*a*. At least one second slotted pipe 152 may be coupled to the second inlet 150. The second slotted pipe 152 has an open end 154 extending outside of the second container 104 for taking the polluted gas 107 to be treated. The second slotted pipe 152 has an closed end 156 extending inside the second container 104 and further extending into the H2S scavenger chemicals 138. In one aspect, the second slotted pipe 152 may comprise a horizontal portion 160 submerged in the H2S scavenger chemicals 138. The horizontal portion 160 may have a series of slots 162 along a bottom similar to the slots as previously described. The polluted gas 107 may enter into the second slotted pipe 152 and may be releasee into the H2S scavenger chemicals 138 directly through the series of slots 162 from the bottom of the second slotted pipe 152. In one aspect, the open end 154 may be a 3-inch pipe that can be coupled to a tanker truck in the oil field. In some aspect, the plurality of second slotted pipes 152 may be coupled to the second container 104 accordingly.

According to a further aspect, the second inlet 150 may be located under the attaching side 142*a* of the angled plate 142. The second slotted pipe 152 may comprise a vertical portion 170 connected between the horizontal portion 160 and the open end 154 so that the polluted gas 107 to be treated flows downwards along the vertical portion 170 into the horizontal portion 160, as shown in FIG. 1. The polluted gas 107 may be processed in the H2S scavenger chemicals 138 after being released from the slots 162 on the horizontal portion 160.

According to another aspect, a monitoring pipe 180, such as a 1-inch pipe, may be installed on the side wall 104*a* of the second container 104 and located outside of the second container 104. The monitoring pipe 180 may be transparent or translucent and may be made of glass. In this aspect, the monitoring pipe 180 may be in a “U” shape having a first end 180*a* and a second end 180*b*. Both the first end 180*a* and the second end 180*b* may be coupled to the side wall 104*a* at a location below the surface of the H2S scavenger chemicals 138. One end may be close to the surface of the H2S scavenger chemicals 138 and the other end may be close to the bottom wall 104*c* of the second container 104. The monitoring pipe 180 then has a fluid communication with the H2S scavenger chemicals 138 inside the second container 104. Any changes in the H2S scavenger chemicals 138, such as color, sediment, and/or density, may be visualized through the monitoring pipe 180. By monitoring the changes of the H2S scavenger chemicals 138 in the monitoring pipe 180, changes of the H2S scavenger chemicals 138 inside the second container 104 can be known in order to determine when the scavenger chemicals 138 requires changing.

Figure 2:
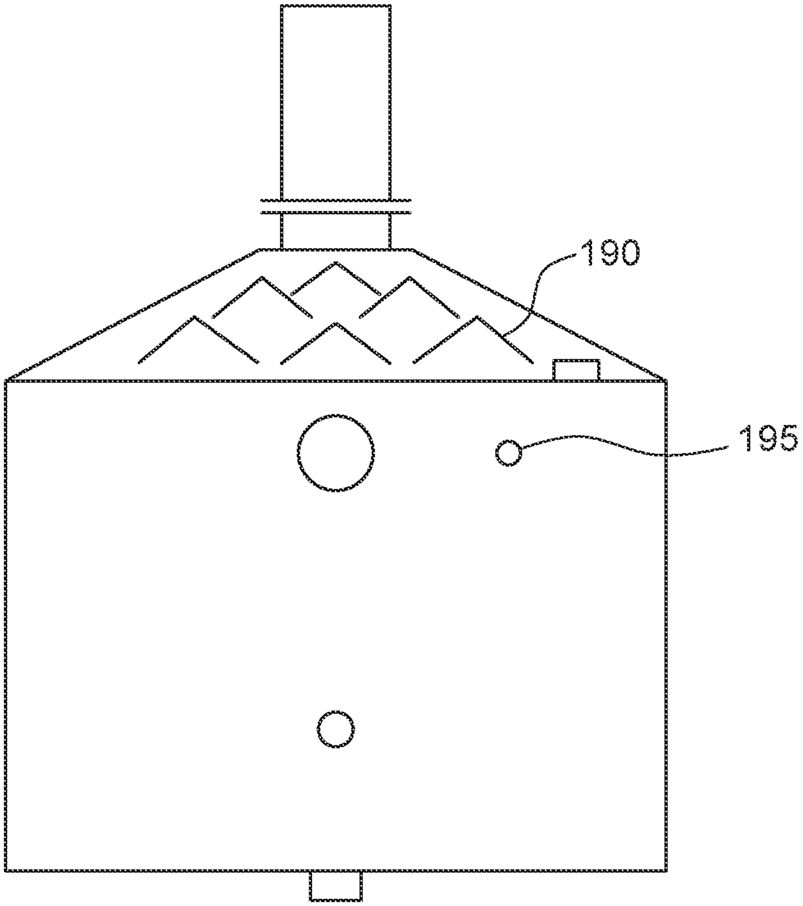
FIG. 2 is a front view of a H2S scrubber according to another embodiment.
Figure 3:
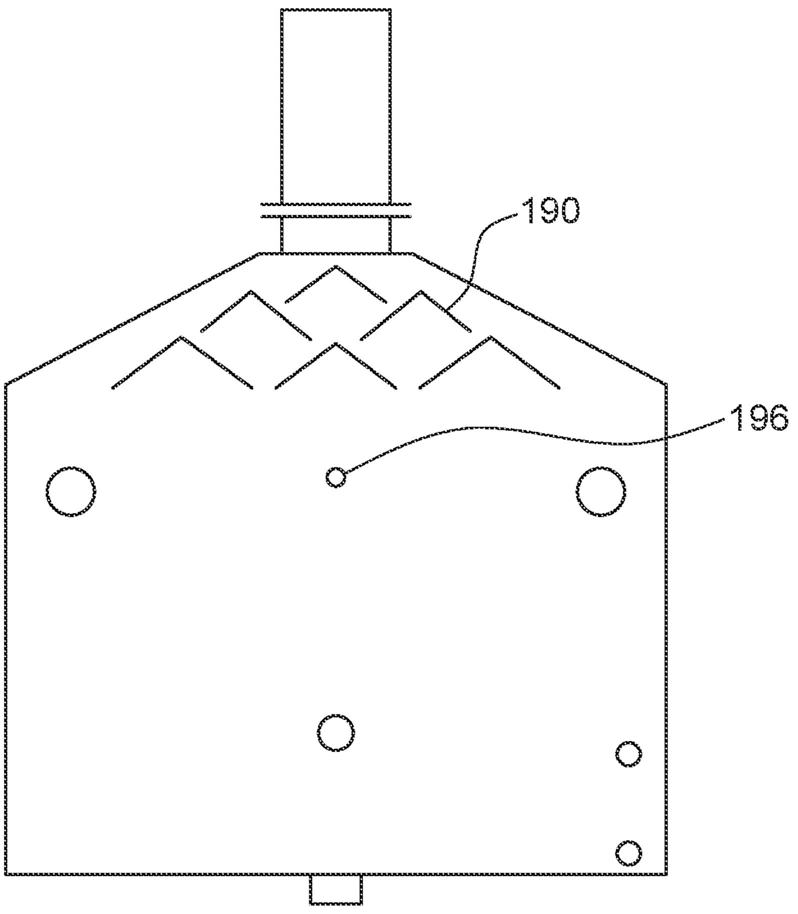
FIG. 3 is back view of the H2S scrubber of FIG. 2.

According to another aspect, the top wall 104*b* of the second container 104 may be in a conical shape, as shown in FIGS. 2 and 3. A plurality of angled baffles 190 may be attached to the top wall 104*b* inside the second container 104. The angled baffles 190 may have an arc-shaped cross-section or a triangular-shaped cross-section. The arc-shaped cross section may face downward or the triangle-shaped cross-section may have two sides extending downward. The two sides of the angled baffles 190 may further collect condensation from the treated gas. The condensed liquid may drop onto the top surface of the angled plate 142 and flow down towards the release exit 144. The flow of the condensed liquid may then be returned to the scavenger chemicals 138. Should the condensed liquid have any hydrogen sulfide, the condensed liquid may be further treated by the scavenger chemicals 138. In this way, the final treated gas released out into the environment may have a reduced amount of hydrogen sulfide after a number of treatments.

In one aspect, each of the first container 102 and the second container 104 may comprise multiples collars for cleaning purpose and for coupling with measurement sensors, such as pressure gage and/or temperature gage. For example, the first container 102 and/or the second container 104 may have a 3-inch collar located on the top wall shown in FIG. 2 for receiving water or cleaning agent in order to clean inside of the containers 102, 104. The second container 104 may have two ½ inch collars shown in FIGS. 2 and 3, one coupled with a pressure gage 195 and the other one coupled with a temperature gage 196 so the temperature and the pressure inside the second container 104 may be monitored in real time. Multiple different sizes of collars may be arranged on the first container 102 and/or the second 104 for different purposes.

According to one aspect, a method of treating H2S of a polluted gas 107 from oil spill or other type of spill is provided. The polluted gas 107 could be in the form of gas or steam, or an aerosolized liquid in the polluted gas 107. The method may comprise the steps of injecting the polluted gas 107 into the first container 102, for example from a vacuum truck (not shown) under certain conditions, such as a pressure of approximately 2-pounds per square inch (PSI) and a maximum flow rate of approximately 3800-cubic feet per minute (CFM). The flow of the polluted gas 107 may then enter the plurality of slotted pipes 130 located in the second container 104. The polluted gas 107 may be released from the slots 136 at the bottom of the slotted pipes 130 into the H2S scavenger chemicals 138 for treatment. In this example, the inside of second container 104 may have a pressure of about 3 pounds per square inch (PSI) and a temperature of about 190° F. The components in the polluted gas 107 may be treated under this condition. In particular, the hydrogen sulfide in the polluted gas 107 may react with one or more chemicals in the H2S scavenger chemicals 138. For example, the H2S in the pollutant may be dissolved in the H2S scavenger chemicals 138 and the H2S may be oxidized to form elemental sulfur. The initially treated gas after the first treatment in the H2S scavenger chemicals 138 may rise from the H2S scavenger chemicals 138. A small portion of the initially treated gas after the first treatment may be released out to the environment through the outlet 112 of the second container 104. However, a majority of the initially treated gas may be condensed into a liquid on the angled plate 142 and drop back into the H2S scavenger chemicals 138 for further treatment. The condensed liquid may be treated a second time or further more times in the H2S scavenger chemicals 138. The multiple treatments caused by the angled plate 142 may ensure the polluted gas 107 is deeply treated and clean gas may be released to the environment.

According to another aspect, the polluted gas 107 may be injected directly into the second slotted pipes 152 on the second container 104, for example from a tank trailer at atmospheric pressure. The polluted gas 107 may be release from the series of slots 162 at the bottom of the second slotted pipes 152 into the H2S scavenger chemicals 138 for treatment. A portion of the treated gas after the first treatment may be condensed into liquid by the angled plate 142 and drop back into the H2S scavenger chemicals 138 for further multiple treatments, as described above.

Of course, the first container 102 and the second container 104 each may include a plurality of inlets, such as 3 inches or 6 inches, on its side wall to allow multiple sources of polluted gas to inject. Each of the first container 102 and the second container 104 may also include a plurality of collars having pressure gauge or temperature gage installed on the side wall.

The components described in the description may be listed below for reference:

scrubber 100,
first container 102,
side wall 102*a* of the first container 102,
top wall 102*b* and bottom wall 102*c* of the first container 102,
shared portion 102*d*,
first drain pipe 103,
openings 110,
baffle 120,
entrance 122,
second container 104,
side wall 104*a* of the second container 104,
top wall 104*b* and bottom wall 104*c* of the second container 104,
inlet 106 of the first container 102,
intake polluted gas 107,
first inlet pipe 108,
outlet 112,
slotted pipes 130,
open end 132 and closed end 134 of the slotted pipes 130,
slots 136 of the slotted pipes 130,
H2S scavenger chemicals 138,
angled plate 142,
drain pipe 140,
attaching side 142*a*,
free side 142*b*,
release exit 144,
initially treated gas 145
treated gas 146,
second inlet 150,
second slotted pipe 152,
open end 154 and closed end 156 of the second slotted pipe 152,
horizontal portion 160,
slots 162 of the second slotted pipe 152,
vertical portion 170,
monitoring pipe 180,
first end 180*a* and second end 180*b* of the monitoring pipe 180,
angled baffles 190,
coupling 194,
pressure gage 195, and
temperature gage 196.

Although embodiments have described scrubbers for scrubbing hydrogen sulfide, the invention is limited to treat the particular pollutant. It can apply to other pollutants contained in the polluted waste.

Changes can be made to the invention in light of the above "Detailed Description" while the above description details certain aspects of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A scrubber for scrubbing pollutants from polluted waste, comprising:

a first container having a side wall, a bottom wall, and a top wall for containing the polluted waste, the first container comprising an inlet and at least one opening; and a second container having a side wall, a bottom wall, and a top wall for containing scavenger chemicals;

wherein the second container comprises an outlet for releasing clean air and at least one slotted pipe coupled to the at least one opening for receiving the polluted waste, the slotted pipe submerged in the scavenger chemicals;

wherein the second container further comprises an angled plate attached to the side wall of the second container above the scavenger chemicals for condensing a treated gas released from the scavenger chemicals back into the scavenger chemicals; and wherein the second container further comprises a plurality of angled baffles within the second container and attached to the top wall of the second container.

2. The scrubber of claim 1, wherein the first container comprises a plurality of openings, and the second container comprises a plurality slotted pipes, each of the plurality of pipes coupled to one of the plurality of openings.

3. The scrubber of claim 1, wherein each of the at least one slotted pipe comprises a series of bottom-facing slots.

4. The scrubber of claim 1, wherein each of the angled baffles has an arc-shaped cross-section, a triangular-shaped cross-section, or a combination of the arc-shaped cross-section and the triangular-shaped cross-section.

5. The scrubber of claim 1, wherein the first container comprises an inlet pipe coupled to the inlet for directly attaching to a vacuum truck.

6. The scrubber of claim 1, wherein each of the first container and the second container comprises a drain pipe on the bottom wall for draining deposits.

7. The scrubber of claim 1, wherein the polluted waste is polluted gas and the pollutants include hydrogen sulfide.

8. A scrubber for scrubbing pollutants from polluted waste, comprising:

a first container having a side wall, a bottom wall, and a top wall for containing the polluted waste, the first container comprising an inlet and at least one opening; and a second container having a side wall, a bottom wall, and a top wall for containing scavenger chemicals;

wherein the second container comprises an outlet for releasing clean air and at least one slotted pipe coupled to the at least one opening for receiving the polluted waste, the slotted pipe submerged in the scavenger chemicals; and wherein the second container further comprises an angled plate attached to the side wall of the second container above the scavenger chemicals for condensing a treated gas released from the scavenger chemicals back into the scavenger chemicals; and wherein the angled plate has a free side extending downwards toward the scavenger chemicals so that the angled plate forms an acute angle with respect to the side wall of the second container.

9. A scrubber for scrubbing pollutants from polluted waste, comprising:

a first container having a side wall, a bottom wall, and a top wall for containing the polluted waste, the first container comprising an inlet and at least one opening; and a second container having a side wall, a bottom wall, and a top wall for containing scavenger chemicals;

wherein the second container comprises an outlet for releasing clean air and at least one slotted pipe coupled to the at least one opening for receiving the polluted waste, the slotted pipe submerged in the scavenger chemicals;

wherein the second container further comprises an angled plate attached to the side wall of the second container above the scavenger chemicals for condensing a treated gas released from the scavenger chemicals back into the scavenger chemicals; and wherein the second container further comprises a second inlet pipe located under the angled plate, the second inlet pipe having an open end extending to outside of the second container for taking the polluted waste and a horizontal portion submerged in the scavenger chemicals for releasing the polluted waste into the scavenger chemicals.

10. The scrubber of claim 9, wherein the horizontal portion of the second inlet pipe has a series of bottom-facing slots.

11. A scrubber for scrubbing pollutants from polluted waste, comprising:

a first container having a side wall, a bottom wall, and a top wall for containing the polluted waste, the first container comprising an inlet and at least one opening; and a second container having a side wall, a bottom wall, and a top wall for containing scavenger chemicals;

wherein the second container comprises an outlet for releasing clean air and at least one slotted pipe coupled to the at least one opening for receiving the polluted waste, the slotted pipe submerged in the scavenger chemicals;

wherein the second container further comprises an angled plate attached to the side wall of the second container above the scavenger chemicals for condensing a treated gas released from the scavenger chemicals back into the scavenger chemicals; and wherein the second container further comprises a monitoring pipe made of transparent or translucent material visible from outside the second container and in fluid communication with the scavenger chemicals inside the second container.

12. A scrubber for scrubbing pollutants from polluted waste, comprising:

a first container having a side wall, a bottom wall, and a top wall for containing the polluted waste, the first container comprising an inlet and at least one opening; and a second container having a side wall, a bottom wall, and a top wall for containing scavenger chemicals;

wherein the first container has a shared portion on the side wall shared with a portion of the side wall of the second container;

wherein the second container comprises an outlet for releasing clean air and at least one slotted pipe coupled to the at least one opening for receiving the polluted waste, the slotted pipe submerged in the scavenger chemicals; and wherein the second container further comprises an angled plate attached to the side wall of the second container above the scavenger chemicals for condensing a treated gas released from the scavenger chemicals back into the scavenger chemicals.

13. The scrubber of claim 12, wherein the at least one opening is located on the shared portion.

14. A scrubber for scrubbing pollutants from polluted waste, comprising:

a first container having a side wall, a bottom wall, and a top wall for containing the polluted waste, the first container comprising an inlet, at least one opening, and a baffle arranged above the at least one opening for forming an entrance for guiding the polluted waste to enter the at least one opening; and a second container having a side wall, a bottom wall, and a top wall for containing scavenger chemicals;

wherein the second container comprises an outlet for releasing clean air and at least one slotted pipe coupled to the at least one opening for receiving the polluted waste, the slotted pipe submerged in the scavenger chemicals; and wherein the second container further comprises an angled plate attached to the side wall of the second container above the scavenger chemicals for condensing a treated gas released from the scavenger chemicals back into the scavenger chemicals.

15. The scrubber of claim 14, wherein the entrance has an area larger than that of an inlet pipe coupled to the inlet to minimize pressure buildup within the first container.

* * * * *